(12) United States Patent
Winick (10) Patent No.: US 7,651,530 B2
(45) Date of Patent: Jan. 26, 2010

(54) SUPERVISION OF HIGH VALUE ASSETS (75) Inventor: Steven J. Winick, Woodmere, NY (US)

(73) Assignee: Honeywell International Inc., Morristown, NJ (US)

( * ) Notice: Subject to any disclaimer, the term of this patent is extended or adjusted under 35 U.S.C. 154(b) by 721 days.

(21) Appl. No.: 10/805,702

(22) Filed: Mar. 22, 2004

(65) Prior Publication Data

US 2005/0210532 A1   Sep. 22, 2005

(51) Int. Cl.
G06F 11/30 (2006.01)
G08B 13/00 (2006.01)
G08B 21/00 (2006.01)
G08B 23/00 (2006.01)
G08B 29/12 (2006.01)

(52) U.S. Cl. .................. 726/35; 340/5.8; 340/5.81; 709/224

(58) Field of Classification Search ............. 726/35
See application file for complete search history.

(56) References Cited

U.S. PATENT DOCUMENTS

| | | | | | |
|---|---|---|---|---|---|
| 4,647,914 | A | * | 3/1987 | Alexander | 379/44 |
| 4,980,913 | A | * | 12/1990 | Skret | 713/153 |
| 5,406,260 | A | * | 4/1995 | Cummings et al. | 340/568.2 |
| 6,021,493 | A | * | 2/2000 | Cromer et al. | 726/35 |
| 6,026,492 | A | * | 2/2000 | Cromer et al. | 726/35 |
| 6,038,322 | A | * | 3/2000 | Harkins | 380/279 |
| 6,079,033 | A | * | 6/2000 | Jacobson et al. | 714/47 |
| 6,087,937 | A | * | 7/2000 | McCarthy | 340/567 |
| 6,279,113 | B1 | * | 8/2001 | Vaidya | 726/23 |
| 6,950,946 | B1 | * | 9/2005 | Droz et al. | 726/35 |
| 7,092,943 | B2 | * | 8/2006 | Roese et al. | 707/9 |
| 7,181,017 | B1 | * | 2/2007 | Nagel et al. | 380/282 |
| 7,295,556 | B2 | * | 11/2007 | Roese et al. | 370/395.3 |
| 2002/0013867 | A1 | * | 1/2002 | Matsuki et al. | 710/22 |
| 2002/1009182 | | * | 7/2002 | Anderson et al. | 709/225 |

(Continued)

FOREIGN PATENT DOCUMENTS

WO   WO2005/048088   *   5/2005

OTHER PUBLICATIONS

Steinfeld, E.F.; "Devices that play together, work together"; pp. 65-70; Sep. 13, 2001; www.reed-electronics.com/ednmag/contents/images/154802.pdf, printed Dec. 17, 2003.

*Primary Examiner*—Christian LaForgia
(74) *Attorney, Agent, or Firm*—Husch Blackwell Sanders Welsh & Katz (57) ABSTRACT

Electronic devices in a local area network (LAN), e.g., a DVD video recorder, plasma display, and audio controller in a home network, are protected by a security system that is networked with the devices. In one aspect, the security system periodically polls the devices to confirm that they are present in the LAN. If a device does not respond, an alarm is set. Installation of the electronic device in an unauthorized network is detected by verifying the Internet Protocol (IP) address of the device, such as when the device attempts to contact a server that provides services such as downloading new or updated software to the device, performing remote programming, and uploading diagnostic data. The devices may encrypt their messages using encryption codes that are unique individually or for a specified group of electronic devices.

26 Claims, 3 Drawing Sheets

U.S. PATENT DOCUMENTS

| | | |
|---|---|---|
| 2002/0108058 A1* | 8/2002 | Iwamura .................... 713/201 |
| 2002/0196147 A1* | 12/2002 | Lau ........................ 340/573.1 |
| 2003/0041238 A1* | 2/2003 | French et al. ............... 713/153 |
| 2003/0108018 A1* | 6/2003 | Dujardin et al. ............. 370/338 |
| 2003/0191935 A1* | 10/2003 | Ferguson .................... 713/153 |
| 2003/0217137 A1* | 11/2003 | Roese et al. ................ 709/223 |
| 2003/0217151 A1* | 11/2003 | Roese et al. ................ 709/225 |
| 2003/0225893 A1* | 12/2003 | Roese et al. ................ 709/227 |
| 2004/0024869 A1* | 2/2004 | Davies ....................... 709/224 |
| 2004/0030778 A1* | 2/2004 | Kronenberg et al. ........ 709/224 |
| 2004/0212493 A1* | 10/2004 | Stilp .......................... 340/531 |
| 2005/0044404 A1* | 2/2005 | Bhansali et al. ............. 713/200 |
| 2007/0118645 A1* | 5/2007 | Suters ........................ 709/225 |
| 2008/0134284 A1* | 6/2008 | Bhansali et al. ................ 726/1 |
| 2008/0137843 A1* | 6/2008 | Bhansali et al. ............... 380/29 |
| 2008/0141383 A1* | 6/2008 | Bhansali et al. ............... 726/35 |

\* cited by examiner

SUPERVISION OF HIGH VALUE ASSETS

BACKGROUND OF THE INVENTION

1. Field of Invention

The invention relates generally to a method and system for securing high value assets such as electronic devices, including, e.g., television displays and audio equipment in a local area network such as may be used in a home.

2. Description of Related Art

Recently, consumer electronics manufacturers and others have begun to provide network connectivity for high-end electronic devices such as plasma displays, audio control servers, media converters, and the like. Moreover, it is expected that this functionality will be available for more and more devices as the price of the technology is reduced. For example, Ethernet connectivity to a local area network (LAN) in a home, business, or school, may be provided by equipping each of the electronic devices with a network interface card, and connecting the devices at a common connection point such as a hub or gateway. Universal plug and play (UPnP™) is one protocol that has been developed to facilitate connectivity among devices from different vendors.

The hub or gateway, in turn, may communicate via a cable modem or DSL line to provide broadband access to the Internet. This network connectivity provides various advantages, such as allowing the electronic devices to network and transfer entertainment content among themselves. Moreover, the electronic devices may communicate via the Internet with remote servers that provide services for the electronic devices such as downloading new or updated software to the devices, performing remote programming, and uploading diagnostic data.

However, there is a need to protect such networked electronic devices from theft and to track their use in unauthorized networks.

BRIEF SUMMARY OF THE INVENTION

The present invention addresses the above and other issues by providing a method and system for securing electronic devices such as those used in local area networks in the home.

In a particular aspect of the invention, an electronic device in a local area network includes a network interface that communicates with a connection point of the local area network, and that receives a polling signal from a security system in the local area network via the connection point, and a control that causes the network interface to communicate a response to the security system via the connection point in response to receipt of the polling signal.

In another aspect of the invention, a security system includes a network interface that communicates with a connection point of a local area network, and a control that causes the network interface to transmit a polling signal to an electronic device in the local area network via the connection point. The control sets an alarm if a response to the polling signal is not received from the electronic device.

In another aspect of the invention, an electronic device in a local area network includes a network interface that communicates with a connection point of the local area network, and a control that causes the network interface to transmit a message, via the connection point, to a remote server. The message includes an address and an identifier associated with the electronic device.

In yet another aspect of the invention, a security system server includes a network interface that receives a message that includes an address and an identifier associated with an electronic device, where the electronic device is provided in a local area network, and means for determining whether the address is consistent with the identifier.

Corresponding methods and program storage devices may also be provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
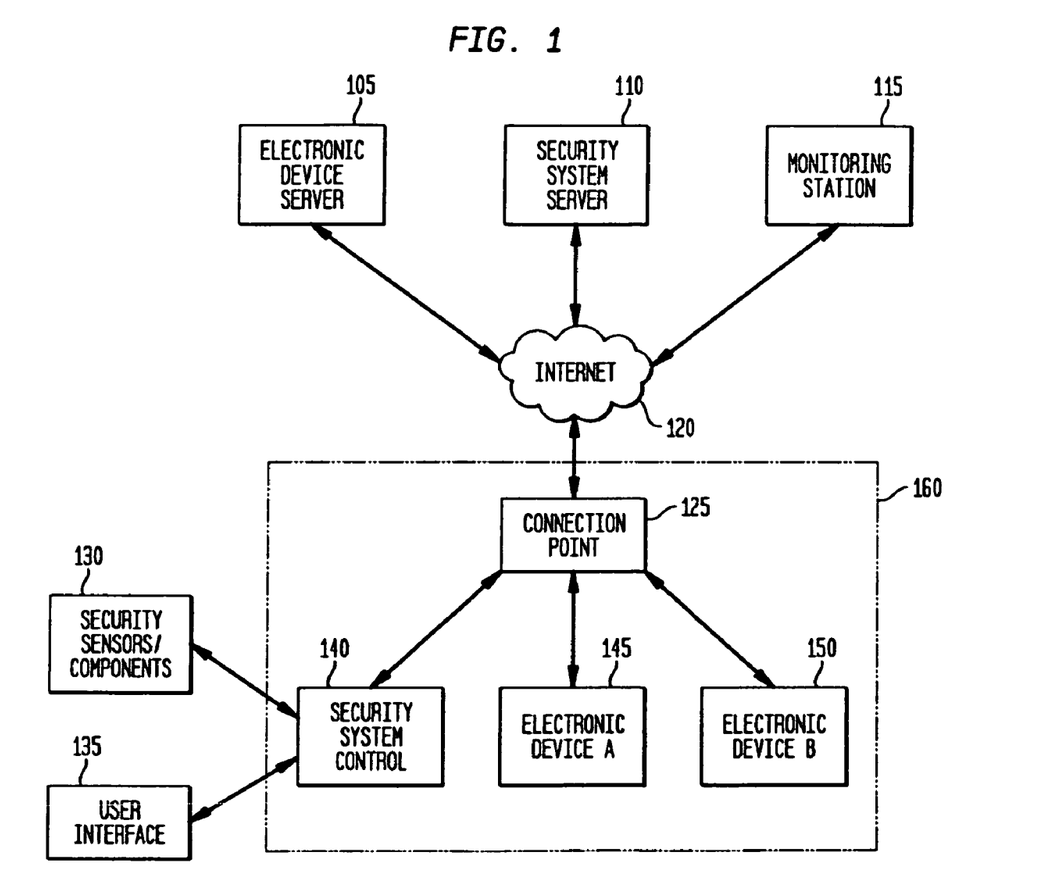
FIG. 1 illustrates an overview of an example system for securing electronic devices in a local area network, according to the invention.

FIG. 1 illustrates an overview of an example system for securing electronic devices in a local area network, according to the invention. Example electronic devices 145, 150 such as plasma, projection, or LCD displays, audio control servers and the like may be networked with one another via a connection point 125 such as a gateway or hub. As mentioned, network connectors are becoming a standard feature on many high-end consumer electronic devices. One common use is to add the capability to remotely program digital video recorders. For example, a television may be networked with a hard-disk and DVD video recorder to share electronic program guide data. Also, users can set a timer recording while away from home. Furthermore, a networked digital music player can stream digital audio from any PC connected to the network to a device such as an audio amplifier. A media server may contain a library of CDs and DVDs. A media computer may have a TV tuner, DVD player and recorder and a personal video recorder that records programs on a hard drive. Similarly, game consoles, portable music players and other devices can also be networked.

Each electronic device includes a network interface component for sending and receiving data according to a network architecture such as Ethernet. The connection point 125 may provide a link to a network such as the Internet 120, or other network, such as an intranet of an enterprise such as a corporation, university, or government organization. For example, the connection point 125 may include a cable, DSL or dial-up modem for communicating via the Internet 120. Cable and DSL modems provide an always-on connection to the Internet. The electronic devices 145, 150 may communicate via connection point 125 with a remote electronic device server 105 for various purposes. For example, the electronic device server 105 may provide services for the electronic devices 145, 150 such as downloading new or updated software, e.g., including firmware or micro-code, to the devices, performing remote programming, and uploading diagnostic data. Moreover, as discussed further below, the electronic devices may periodically communicate with the electronic device server 105 to verify that they are installed in an authorized network. The electronic devices 145, 150 may also communicate with one another, such as to network and transfer entertainment content, e.g., audio and/or video data.

In accordance with one aspect of the invention, a security system control 140 also communicates with the connection point 125. A local area network (LAN) 160 thus includes the security system control 140, the example electronic devices 145, 150, and the connection point 125. Other electronic devices may be included as well, such as one or more personal computers. Generally, the LAN 160 can be provided in a home as a home network that provides entertainment and information to a family. For example, the various electronic devices may control the storage and playback of movies, video games, web content and the like. However, the LAN can be provided in other applications as well. For example, in an office, the LAN may include electronic devices such as workstations, printers, and copiers that communicate with one another. In a laboratory, the LAN may include electronic devices such as a workstation, blood analyzer and chromatograph. Generally, the LAN may include any electronic devices that benefit from being networked together. Moreover, the LAN can be located in one or more buildings or other structures.

The security system control 140 may communicate with security sensors and components such as window and door sensors and motion detectors, which can be installed in a building in a known manner to detect intrusion in the building. Other components such as a wireless key fob that is used to trip an alarm may also be used. The security system controller 140 communicates via a wired or wireless path with the sensors/components 130. The security system control 140 may also communicate with a user interface device 135 such as a keypad/display, e.g., a multi-line LCD display, which displays status information to the user and receives commands, such as for arming or disarming the security system or using other features. The security system control 140 may be provided as a control panel that is separate from the user interface 135, and which is installed in an unobtrusive location in the home, such as a closet or basement. However, it is also possible for the security system control 140 and the user interface 135 to be integrated into a common device, such as a wall-mounted or table top unit.

The security system control 140 may include a network interface similar to those used by the electronic devices 145, 150 to enable the security system control 140 and the electronic devices 145, 150 to communicate with one another. The security system control 140 is also configured with logic for communicating with the electronic devices 145, 150. For example, the security system control 140 may include software that is executed by a control for achieving the functionality described herein. Moreover, the electronic devices 145, 150 may be configured with logic for communicating with the security system control 140. For example, the electronic devices 145, 150 may include software that is executed by a control for achieving the functionality described herein. In particular, the electronic devices 145, 150 may be configured essentially as sensors of the security system control 140, and supervised thereby, so that an alarm condition is set by the security system control 140 when certain behaviors by the electronic devices are detected.

For example, the security system control 140 may periodically send a signal, such as a polling signal, to each of the electronic devices 145, 150 to confirm that they are connected to the LAN 160. Each electronic device 145, 150 is configured to respond to the polling signal to confirm that it remains attached to the LAN 160. In one possible implementation, the polling signal is sent to each electronic device every ten seconds when the security system control 140 is armed. The security system control 140 then sets an alarm if a response is not received within a predetermined time, such as five seconds. The electronic devices 145, 150 are able to respond to the polling signal whenever they are receiving power, such as by being plugged into a wall outlet. Thus, if one or more of the electronic devices 145, 150 is removed from the LAN 160, such as by removing the wired jack from the network interface socket, the security system control 140 will set an alarm. Such removal may occur by a thief, for example. If a wireless network interface is used, removal of the electronic device can be detected when the electronic device is unplugged from the wall outlet and/or is out of range from the connection point 125.

Note that an authorized user such as the owner of the electronic devices can remove the electronic devices from the LAN 160, if desired, by disarming the security system control 140. This may be achieved by entering a password into the user interface 135, for example. The user interface 135 may allow the user to arm and disarm the building intrusion detection features separately from security features for the LAN 160.

Generally, the security system control 140 may be configured during a set-up operation, which may occur automatically and/or manually. In a possible automatic process, the security system control 140 queries each electronic device in the LAN 160 to obtain information regarding each device's identity. This may include information regarding the type of the component, e.g., plasma display or audio controller, and an identifier such as the serial number and the IP address (discussed further below), for example. The querying process may be performed each time the security system control 140 is armed, for instance. In a manual process, the user enters the information regarding the electronic components 145, 150 via the user interface 135, which provides a menu to prompt the user to enter specific information for each electronic device. The specific information is stored so it need not be re-entered.

The security system control 140 may communicate with a security system server 110 via the connection point 125 and the Internet 120, e.g., to receive software updates from the security system server 110, and to communicate alarm status information to the security system server 110. The security system server 110 may also control the automatic configuring of the security system control 140 during set-up, for instance. The security system server 110 thus provides services for the security system control 140.

Generally, the security system control 140 may set a local and/or remote alarm when it detects that one of the electronic devices 145, 150 has been removed from the LAN 160. A local alarm may include an audible alarm such as a siren that is installed in the home or other building in which the LAN 160 is located. The security system control 140 may also report the alarm to the security system server 110. Encryption and two-way authentication may be used between the security system control 140 and the security system server 110. Once the security system server 110 has verified the integrity of a received alarm, it communicates a message to a monitoring station 115, which may be a manned facility in which an operator contacts the local police to report the alarm. The security system server 110 and the monitoring station 115 may be co-located, although this is not required. The information provided by the security system control 140 to the security system server 110 may include the address of the location of the LAN 160 and an identifier of the electronic device, such as a serial number, IP address, and description, whose removal was detected. The security system control 140 may also communicate with a telephone dialer that dials the monitoring station 115. Other communication paths such as long-range radio and cellular telephone may also be used.

Note that the invention may use any type of LAN or other network. For example, in addition to Ethernet, technologies that may be used include power line networking, which uses a home's existing electrical outlets and wiring, phone line networking, which uses a home's existing phone jacks and wiring, and wireless networking, which may use, e.g., RF or infrared signals. Wireless network technologies and organizations include Bluetooth, Infrared Data Association (IrDA), which is a standard for devices to communicate using infrared light pulses, HomeRF (Shared Wireless Access Protocol or SWAP), and the Wireless Ethernet Compatibility Alliance or WECA (Wi-Fi). Moreover, communications via the Internet 120 may use TCP/IP or any other protocol.

Figure 2:
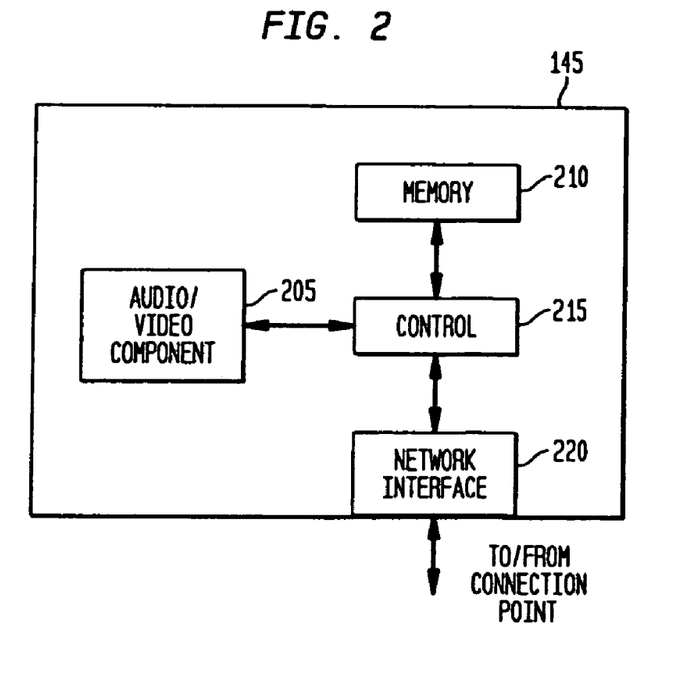
FIG. 2 illustrates an example electronic device, according to the invention.

FIG. 2 illustrates an example electronic device, according to the invention. The electronic device can be any type of device as mentioned that might be found in a network in a home, business or other setting. In simplified form, the electronic device 145 includes a network interface 220, which may be a network interface card or network adapter card of the type that is commonly used in computers, e.g., personal computers and workstations. Generally, the network interface 220 is compatible with the type of LAN used, and includes a transmit and receive capability to and from the connection point 125 via a wired or wireless path. A control 215 may execute software, e.g., including firmware or micro-code, stored in a memory 210 to achieve the desired functionality. The memory 210 may thus be considered a program storage device. A dedicated chip such as an ASIC may also be used. The memory 210 may include volatile and non-volatile storage components. The control 215 is shown communicating with an example audio/video component 205. For example, in a plasma display, this component may be a display driver.

Figure 3:
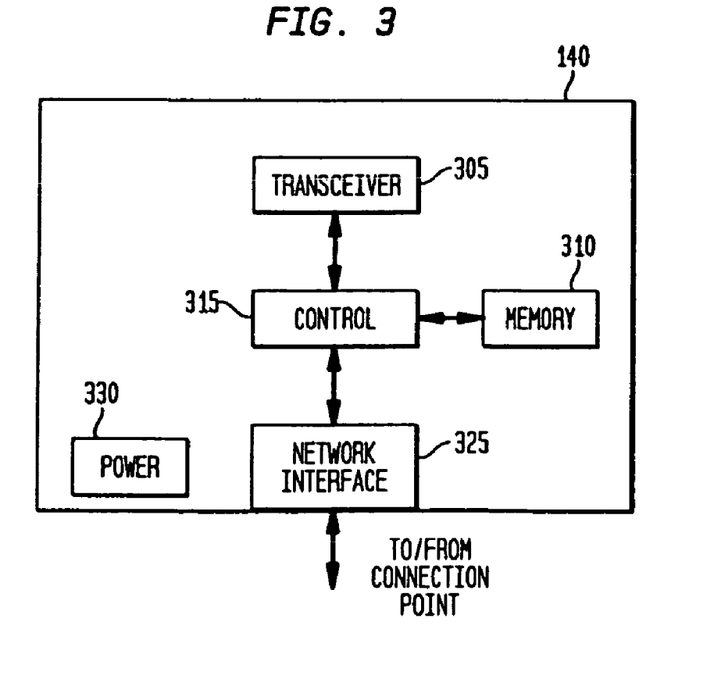
FIG. 3 illustrates an example security system control, according to the invention.

FIG. 3 illustrates an example security system control, according to the invention. In simplified form, the security system control 140 includes a network interface 325 as discussed above. A control 315 may execute software, e.g., including firmware or micro-code, stored in a memory 310 to achieve the desired functionality. The memory 310 may thus be considered a program storage device. The memory 310 may include volatile and non-volatile storage components. The control 315 communicates with a transceiver 305, which may receive signals from, and send signals to, the various sensors and components that detect intrusion in the building in which the LAN 160 is located. Typically, it is only necessary to receive signals from the sensors and send signals to a component such as a siren. A power source 330 provides power to the security system control 140 and typically includes a battery backup to AC power.

Figure 4:
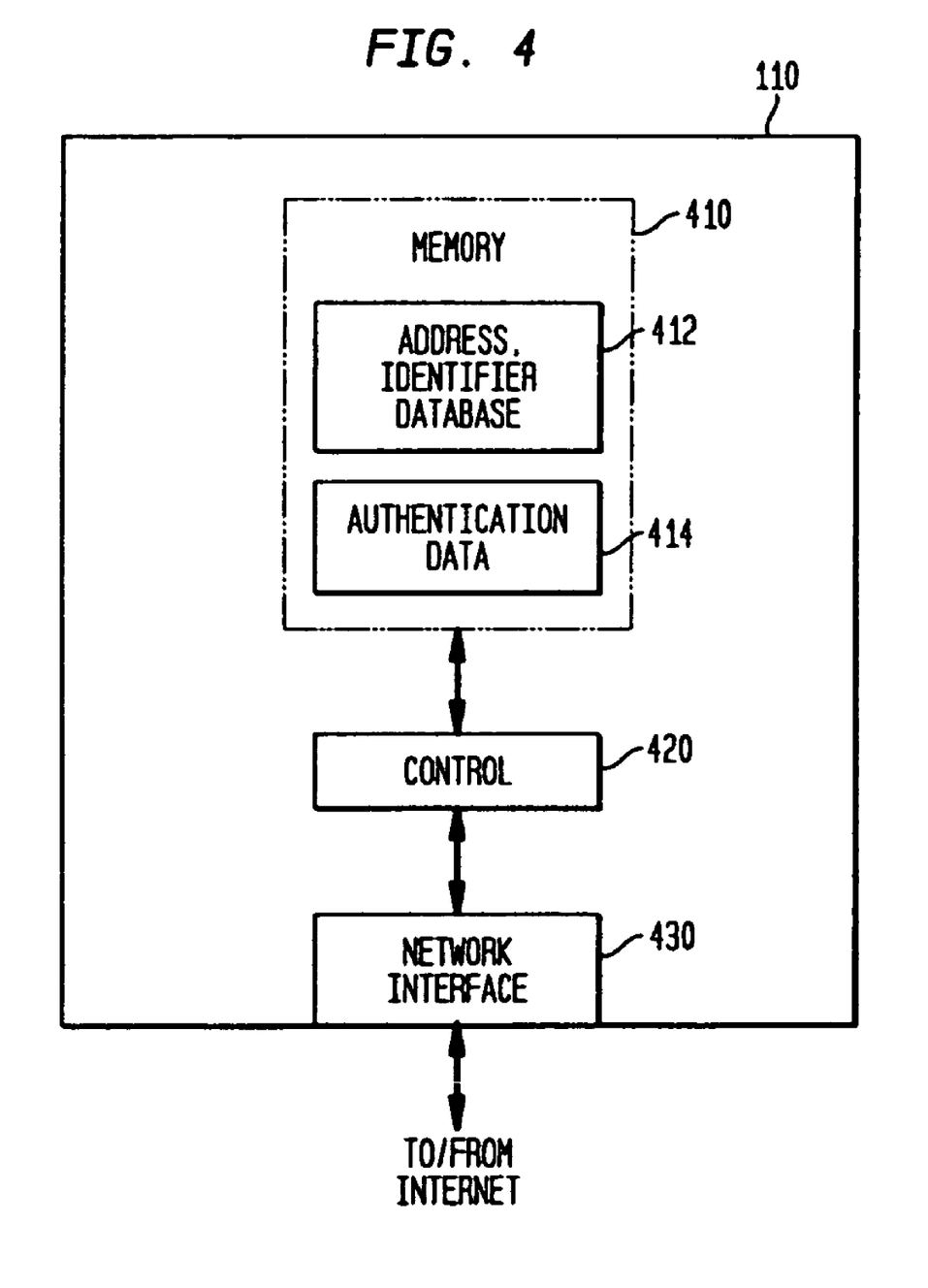
FIG. 4 illustrates an example security system server, according to the invention.

FIG. 4 illustrates an example security system server, according to the invention. In simplified form, the security system server 110 includes a network interface 430 as discussed above. A control 420 may execute software, e.g., including firmware or micro-code, stored in a memory 410 to achieve the desired functionality. The memory 410 may thus be considered a program storage device. The memory 410 may include volatile and non-volatile storage components. Moreover, the memory 410 may include a database 412 that stores information relating to the electronic devices that are protected. This information may include, e.g., an address of the associated network, such as an Internet Protocol (IP) address, and an identifier of each electronic device, such as a serial number and a description of the device, such as brand, model, device type (display, video recorder, etc.). Information relating to the registered owner of the electronic devices, such as name, phone number, etc., may also be stored. Moreover, authentication data 414 may be stored for authenticating communications from the security system control 140 and/or the electronic devices.

In one approach, the IP address is a 32-bit address that uniquely identifies the network, via a network part of the address, and the electronic device, e.g., host, via a host part of the address. The network part of the IP address is associated with the LAN 160, and may be assigned from an available block of addresses, e.g., by the electronic device server 105. The host part of the address can be configured into each host electronic device, e.g., by the electronic device server 105, using the dynamic host configuration protocol (DHCP), for instance. Generally, the network part of the IP address can be used to verify that an electronic device is authorized to be in a specific network.

The information at the security system server 110 can be used to determine when an electronic device is not connected to the intended network. For example, when an electronic device is added to a network in a user's home, for instance, the identifying information and address of the electronic device can be provided to the security system server 110 in different ways. For example, the information can be provided from the electronic device to the security system control 140 and from there to the security system server 110. Or, the information can be provided from the electronic device to the security system server 110 directly, or via the electronic device server 105. Or, some or all of the information can be manually provided by the user, for example, via a web site associated with the security system server 110. The cryptographic and authentication data used to provide secure communication between the security system control 140 and the security system server 110 may be used by the electronic device 145 to allow it to communicate securely with the security system server 110.

Thus, an electronic device can be registered with the security system server 110 and/or the electronic device server 105 as belonging to a particular owner. The AlarmNet-i from Honeywell is an example of a suitable server. The electronic device server 105 and the security system server 110 can be combined into one server as well. In the event that an electronic device is installed in a different network, and the electronic device attempts to interact with the electronic device server 105, the electronic device server 105 may review its own records or contact the security system server 110 to confirm that the electronic device has not been installed in an unauthorized network, such as by a thief. For example, an electronic device that has been stolen from its original network and installed in an unauthorized network may contact the electronic device server 105 to obtain updated software, sending its identifier and the IP address of the unauthorized network.

Meanwhile, the security system server 110 may have previously received an alarm message from the security system control 140 of the original network indicating that the electronic device has been stolen. This message may indicate:
electronic device type: video recorder
model: Toshiba XYZ
serial number: 123456
IP address: 121.7.106.83
owner: Joe Smith, with contact information
alarm date: Jan. 1, 2004

The message from the electronic device in the unauthorized network to the electronic device server 105 may indicate:
electronic device type: video recorder
model: Toshiba XYZ
serial number: 123456

IP address: 130.67.106.145 owner: Joe Smith, with contact information

The security system server 110 can thus detect the discrepancy or inconsistency in the IP address and take an appropriate action. For example, the security system server 110 can contact the registered owner of the electronic device, via e-mail or telephone, for instance, to verify that the electronic device has been stolen and installed in an unauthorized network. The security system server 110 can also disable the electronic device by triggering a pre-loaded function of the software, for instance. These preferences can be downloaded to the electronic device upon set-up by the registered owner, for example.

The value of the electronic device will typically be impaired if the electronic device is not able to communicate with the electronic device server 105 periodically. It is also possible to design the electronic device so that it must communicate with the electronic device server 105 periodically to verify that it is installed in an authorized network. The owner may enter preferences in this regard via a web site associated with the electronic device server indicating, e.g., that the electronic device must be verified every month.

Furthermore, in a possible enhancement, each of the electronic devices (145, 150) can have a pre-programmed, secret encryption code, which can be individually, e.g., globally, unique. In another approach, the encryption code is unique for a specified group of electronic devices, such as those associated with a particular user. For example, all of the electronic devices in a user's home may share the same encryption code. In communication with a server, special pre-determined data is sent encrypted by that key with a selected encryption algorithm. The matching key is in the server. The server can look up the key, decrypt the encrypted message and thereby authenticate that the source of the message is genuine. This prevents a thief from plugging in a low-cost device in place of the stolen electronic device that spoofs messages that might be provided by the electronic device. This security can also be provided for the local polling and responses, such that the response of the electronic devices is provided as an encrypted message using an encryption code that is unique to the electronic device.

Also, all communications with the server may be initiated automatically by the electronic device itself. This means that communication sessions can freely pass through local firewalls, whereas server initiated communications attempts would be blocked by a premise firewall. For security, this means it is not necessary know where the electronic device is, or what the device's IP address is, in order to supervise it. The electronic device always automatically initiates contact as soon as it is plugged in. In the control sense, this means the electronic device can be controlled remotely, if desired, by waiting for it to initiate contact with the server, and then capture the TCP session and take any desired action. Systems that attempt to use server-initiated control may fail to penetrate firewalls, or require an administrator to open a hole in the local firewall. Such systems also have to know the local IP addresses and can't deal with dynamic IP assignment that is common, e.g., with DHCP.

Accordingly, it can be seen that the present invention provides a method and system for protecting and supervising high value electronic device assets. The invention enables a networked device to communicate directly with the control panel of a security system and act as a new kind of sensor point, for example, as a UPnP point. The electronic device is polled regularly and programmed to respond if it is removed from the network. Moreover, the same security keys and authentication protocol that are used by the security system to report intrusion alarms over the Internet can be used by the electronic device. The invention provides more security functionality, and enables an electronic device to be tracked by IP address, which is generally geographically traceable. Movement and re-installation of the electronic device can be remotely supervised and tracked. Moreover, the invention can be implemented with modest software upgrades to the electronic devices and security system. For example, a UPNP functionality can be provided at the security system control panel or at the connection point. A security object can be provided at the electronic device so that the security system control panel can configure and bind to it.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. An electronic device in a local area network, comprising:
  a network interface that communicates with a connection point of the local area network (LAN), and that receives a polling signal from a first security system in the local area network via the connection point; and
  a control that causes the network interface to communicate a response to the first security system via the connection point in response to receipt of the polling signal, said first security system generates an alarm if said electronic device is not present and, said control causes the network interface to communicate the response through an Internet connection to a second security system as an encrypted message using an encryption code that is unique to the electronic device;
  wherein said message includes an address and an identifier associated with the electronic device and said second security system verifies that said electronic device is installed in an authorized network based upon said address and said identifier;
  software stored in a memory of the electronic device that automatically initiates communication with a server of the electronic device to download new or updated software; and
  a user interface configured to allow a user to arm and disarm building intrusion detection features separately from security features of said LAN.

2. The electronic device of claim 1, wherein: the network interface communicates with at least one other electronic device in the local area network via the connection point to transfer entertainment content.

3. The electronic device of claim 1, wherein: the network interface communicates, via the connection point, with a remote server that provides services for the electronic device.

4. The electronic device of claim 3, wherein: the services include at least one of downloading software to the electronic device, performing remote programming of the electronic device, and uploading diagnostic data from the electronic device.

5. The electronic device of claim 1, wherein: the connection point comprises at least one of a hub and a gateway.

6. The electronic device of claim 1, wherein: the network interface receives software from the security system via the connection point for configuring the electronic device as a sensor of the security system.

7. The electronic device of claim 1, wherein: the security system sets an alarm if it does not receive the response from the network interface after sending the polling signal to the network interface.

8. The electronic device of claim 1, wherein: the control causes the network interface to communicate the response to the security system as an encrypted message using an encryption code that is unique for a specified group of electronic devices.

9. The electronic device of claim 1, wherein said control is configured to not allow spoofing of said electronic device.

10. A security system, comprising:
a security system server;
a local area network (LAN) coupled to the security system server through an Internet connection;
a network interface that communicates with a connection point of the local area network (LAN); and
a control that causes the network interface to transmit a polling signal to an electronic device in the local area network via the connection point, said control causes the network interface to communicate the response to the security system server as an encrypted message using an encryption code that is unique to the electronic device;
software stored in a memory of the electronic device that automatically initiates communication with a server of the electronic device to download new or updated software;
wherein said message includes an address and an identifier associated with the electronic device and said security system server verifies that said electronic device is installed in an authorized network based upon said address and said identifier;
wherein the control sets an alarm if a response to the polling signal is not received from the electronic device; and
wherein said network interface is configured to allow a user to arm and disarm building intrusion detection features separately from security features of said LAN.

11. The security system of claim 10, wherein: the electronic device communicates with at least one other electronic device in the local area network via the connection point to transfer entertainment content.

12. The security system of claim 10, wherein: the network interface communicates, via the connection point, with a remote server that provides services for the security system.

13. The security system of claim 12, wherein: when the alarm is set, the network interface communicates a message to the remote server indicating that the alarm has been set.

14. The security system of claim 13, wherein: the message comprises at least a portion of an Internet Protocol address associated with the electronic device.

15. The security system of claim 10, wherein: the connection point comprises at least one of a hub and a gateway.

16. The security system of claim 10, wherein: the network interface transmits software to the electronic device via the connection point to configure the electronic device as a sensor of the security system.

17. The security system of claim 10, further comprising: means for monitoring at least one sensor for detecting intrusion in a building.

18. The security system of claim 10, wherein: the response to the polling signal is provided as an encrypted message using an encryption code that is unique for a specified group of electronic devices.

19. The security system of claim 10, wherein said control is configured to not allow spoofing of said electronic device.

20. A security system server, comprising:
an electronic device;
software stored in a memory of the electronic device that automatically initiates communication with a server of the electronic device to download new or updated software;
a database of networks and identifiers of electronic devices authorized to operate in each network;
a local area network connected to the electronic device;
a network interface that receives a message that includes an address and an identifier associated with the electronic device; and
a control means coupled to the database for determining whether the address is consistent with the identifier, said control means verifies that said electronic device is installed in an authorized network based upon said address and said identifier and generates an alarm if said electronic device is not present, and said control causes the network interface to communicate the response to the security system as an encrypted message using an encryption code that is unique to the electronic device;
wherein said message includes an address and an identifier associated with the electronic device;
and said network interface is configured to allow a user to arm and disarm building intrusion detection features separately from security features of said LAN.

21. The security system server of claim 20, wherein: the message is received from the electronic device.

22. The security system server of claim 20, wherein: the message is received from a server that provides services for the electronic device.

23. The security system server of claim 20, wherein: the address comprises at least a portion of an Internet Protocol address.

24. The security system server of claim 20, wherein: the identifier comprises a serial number.

25. The security system server of claim 20, wherein: the message is received as an encrypted message using an encryption code that is unique for a specified group of electronic devices.

26. The security system server of claim 20, wherein said control is configured to not allow spoofing of said electronic device.

* * * * *

UNITED STATES PATENT AND TRADEMARK OFFICE
CERTIFICATE OF CORRECTION

PATENT NO. : 7,651,530 B2　　　　　　　　　　　　　　　　　　　　　　　Page 1 of 1
APPLICATION NO. : 10/805702
DATED : January 26, 2010
INVENTOR(S) : Steven J. Winick It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this

Twenty-third Day of November, 2010

David J. Kappos
*Director of the United States Patent and Trademark Office*